Dec. 25, 1951 W. H. LEHMBERG 2,579,589
STORAGE BATTERY SEPARATOR
Filed Feb. 25, 1947
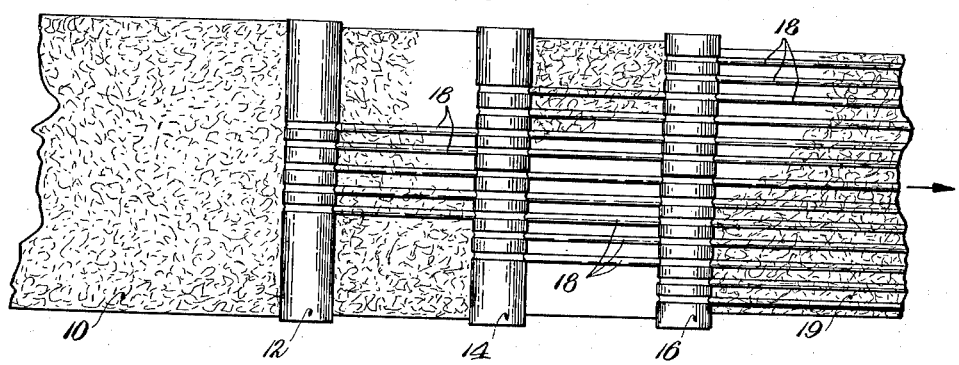
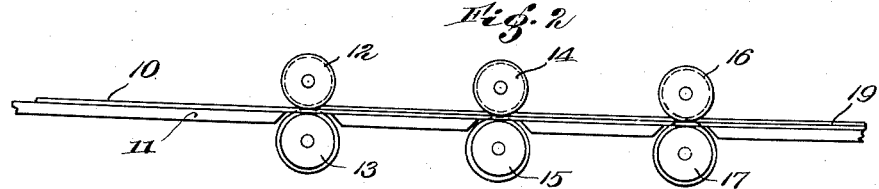
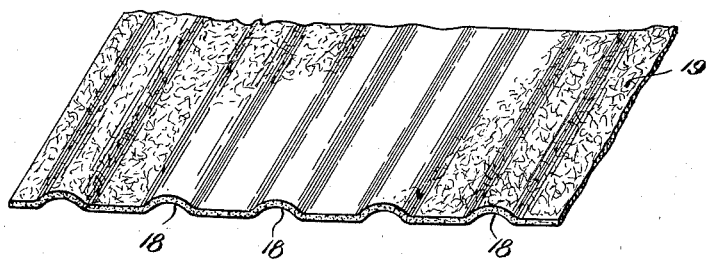
INVENTOR.
William H. Lehmberg
BY Kenway & Witter
attys.

Patented Dec. 25, 1951

2,579,589

UNITED STATES PATENT OFFICE 2,579,589

STORAGE BATTERY SEPARATOR

William H. Lehmberg, Riverside, Conn., assignor to American Felt Company, Boston, Mass., a corporation of Massachusetts Application February 25, 1947, Serial No. 730,799

1 Claim. (Cl. 136—146)

This invention comprises a new and improved storage battery and includes within its scope a novel separator and process of making the same.

The requirements for a satisfactory separator to be used between the plates of a storage battery are very exacting. The material of the separator must first be an insulator. It must also be porous to a high degree, possess a considerable degree of mechanical strength, and have considerable stiffness without being brittle. It must be free from impurities, such as iron and manganese, and preferably of such a character that it can be shipped and stored in dry condition.

The separator of my invention answers all these requirements and possesses in addition the unique characteristic of maintaining its electrical resistance and porosity in battery service by the gradual carbonization and disintegration of certain components which offset the plugging effect of the deposition of metallic salts on the separator.

Going more into detail, the separator of my invention comprises a felt material containing 5–50% thermoplastic binder fibres and 95–50% non-binder fibres unified by coalescence of the binder fibres into sheet form and maintained thereby in stiff resilient condition. For use in the ordniary lead plate storage battery, the separator will contain 95–50% fine vegetable fibre such as cotton, which will be progressively oxidized and disintegrated by the sulfuric acid of the battery, thus increasing its porosity and offsetting the lead sulphate which is deposited thereon.

When the separator is intended for use in a storage battery of the iron or cadmium plate type where an alkali is used as the electrolyte, the separator will contain 95–50% wool fibre. Wool fibres will resist disintegration in sulfuric acid but are disintegrated by an alkaline solution, and by this disintegration increase the porosity of the separator as a whole and thus compensate for the plugging effect of iron or cadmium salts deposited thereon.

In another aspect the invention comprises an improved process of making separators of the type above disclosed having parallel corrugations formed therein. Although it is possible to platen press and corrugate in a single operation the separators of my invention, there are certain disadvantages inherent to this procedure, such as mold costs, difficulty in removing pressed sheets from a corrugated platen, and distortion of the corrugations unless a heating and cooling cycle is employed which results in loss of production efficiency. I have discovered that pressed sheets or continuous length of flat pressed separator material may be advantageously corrugated by passing the flat pressed stock between male and female grooved rolls which engage the stock at different peripheral speeds at the point of contact and so generate sufficient heat to soften the thermoplastic fibre of the separator stock. It is therefore molded into the configuration of the forming rolls and maintained permanently in corrugated shape by the stiffness of the molded binder fibres.

Preferably and as herein shown, the corrugating process is carried out by employing a series of rolls containing a progressively increasing number of corrugations, that is to say, the first set of rolls may be shaped to form only the center corrugations, and each subsequent set of rolls may form an additional number of corrugations approaching the edge of the stock until the full width corrugation is obtained at the exit pair of rolls.

These and other features of the invention will be best understood and appreciated from the following description of a preferred corrugated battery separator and the manner of producing the same as illustrated in the accompanying drawings in which:

Fig. 1 is a plan view showing a strip of separator stock in passage through three sets of corrugating rolls, Fig. 2 is a corresponding view in elevation, and Fig. 3 is a fragmentary view in perspective of a portion of the finished separator.

In general, the stock of the improved separator is based on that disclosed in Boeddinghaus Patents Nos. 2,364,616 and 2,298,274. For purposes of illustration it may be assumed that the composition of the stock is to be 35% thermoplastic Vinyon fibre and 65% India cotton. These fibres are first blended in a conventional raw stock picker to open up the fibre and obtain maximum random distribution or mixing. The blended and picked fibre is now carded by conventional methods and fed to a continuous apron in either straight web or cross web construction. The carded batt is built up to the desired weight, for example, 28 oz. per square yard. It is then cut into sheets for further processing.

The cut sheets of carded batt are then introduced into a flat platen press between cloth or canvas sheets and pressed at a temperature of 280–310° F. to a finished thickness of approximately 0.058". It is sometimes desirable prior to pressing to treat the carded batt with a resin emulsion, for example, an emulsion of vinyl copolymers or polystyrene. This treatment is useful where it is desired to obtain a maximum interfibrillar bonding under a minimum amount of pressure. Under these conditions the finished product will be of low unit density and high porosity as distinguished from stock made without the use of additional binders for which greater pressure is required to effect equivalent bonding of the thermoplastic fibres. The amount of such emulsion used will ordinarily effect only a partial coating of the fibres without any plugging or filling of the voids between them.

If it is desired to corrugate the separator stock, the flat pressed sheet 10, as shown in Figs. 1 and 2, may be advanced upon a table 11 and passed between three co-operating sets of corrugating rolls. The first set comprises the rolls 12 and 13 having five centrally located corrugations. The second set of rolls 14 and 15 includes five corresponding corrugations and four additional corrugations. The third set of rolls 16 and 17 are corrugated throughout their entire length. In passing through the first set of rolls, five parallel longitudinal corrugations 18 are formed in the stock with a spacing of approximately ¼" between them and a slight contraction in the width of the stock will be noted. The second set of rolls provides four additional corrugations with further contraction of the width of the stock, and finally the rolls 16 and 17 produce the fully corrugated stock 19 with another slight contraction in overall width.

It will be understood that if both rolls of each pair are driven at the same speed and are of the same diameter, the surface speed of the rolls will be identical. However, since the rolls are in effect grooved and ribbed, the peripheral speeds of the rolls at the point of contact with the separator stock differ so that a frictional slip is developed generating sufficient heat to soften and form the thermoplastic fibre in the stock. It may in some cases be desirable to increase the amount of heat generated and this can readily be done by increasing the depth of the grooves or the driven speed of one roll with relation to the other. The heating and cooling effect of this treatment is practically instantaneous so that the corrugations formed in the separator stock maintain the dimensional pattern of the grooved rolls. It has been found that the composite fibre felt stock above described may be readily grooved in widths up to 18" and of course this result occurs whether the corrugations are formed by a single roll or by a series of co-operating rolls.

It has been found that for different batteries it is desirable to supply separator stock in thickness varying from 0.015 to 0.065" and in weight from 10 oz. per square yard to approximately 30 oz. per square yard. For example, corrugated separator stock 0.020" in thickness is particularly useful in submarine storage batteries, whereas thicker separators are useful in automotive and industrial storage batteries of the six and twelve volt types.

It will be understood that by coalescence of the thermoplastic fibres I mean the fusion or adhesion of the thermoplastic fibres to each other or to the non-binder fibres in the felt sheet to an extent that unifies the fibres into a sheet having substantial stiffness and resilience and no tendency to unravel at the edges.

It will be noted that one aspect of my invention comprises a novel combination in a lead plate storage battery of the lead plates and sulfuric acid of the battery with felt separator plates comprising thermoplastic fibres which are resistant to the sulfuric acid and cotton fibres which are disintegrated in use by the action of the sulfuric acid, thus increasing the porosity of the separator plates and so offsetting the plugging effect of lead salts deposited thereon.

Having thus disclosed my invention, what I claim as new and desire to secure by Letters Patent is:

A battery separator plate of stiff, resilient felt for use in combination with the lead plates and sulfuric acid of a storage battery and comprising approximately 35% thermoplastic Vinyon fibre and 65% cotton fibre mixed and distributed at random in felt formation and weighing approximately 28 oz./sq. yd., the material of the separator being unified by coalescence of the Vinyon fibre and maintained thereby in stiff resilient condition presenting parallel corrugations, the cotton fibre being progressively oxidized and disintegrated in battery use, thus tending to increase the porosity of the separator and offset the filling effect of lead salts deposited thereon.

WILLIAM H. LEHMBERG.

REFERENCES CITED

The following references are of record in the file of this patent:

UNITED STATES PATENTS

| Number | Name | Date |
|---|---|---|
| 533,751 | Salom | Feb. 5, 1895 |
| 1,020,149 | Marino | Mar. 12, 1912 |
| 1,744,256 | Benner et al. | Jan. 21, 1930 |
| 1,906,342 | Smith | May 2, 1933 |
| 1,981,736 | Martindell | Nov. 20, 1934 |
| 2,278,896 | Rugeley et al. | Apr. 7, 1942 |
| 2,298,274 | Boeddinghaus | Oct. 13, 1942 |
| 2,306,781 | Francis | Dec. 29, 1942 |
| 2,335,757 | Hall | Nov. 30, 1943 |
| 2,430,868 | Francis | Nov. 18, 1947 |

FOREIGN PATENTS

| Number | Country | Date |
|---|---|---|
| 30,602 | Great Britain | Mar. 31, 1911 |
| 473,194 | Great Britain | Oct. 4, 1937 |